United States Patent [19]

Engwall et al.

[11] Patent Number: 4,533,186

[45] Date of Patent: Aug. 6, 1985

[54] CYLINDRICAL TYPE SQUEEZE BEARING SYSTEMS WITH BEARING AND DRIVING ELEMENTS ATTACHED IN AREAS OF MAXIMUM DEFLECTION

[75] Inventors: Mats A. Engwall, Hollister; Richard B. Mulvany, San Jose, both of Calif.

[73] Assignee: International Business Machines Corporation, Armonk, N.Y.

[21] Appl. No.: 470,660

[22] Filed: Feb. 28, 1983

[51] Int. Cl.³ .............................................. F16C 32/06
[52] U.S. Cl. .................................... 308/5 R; 308/1 R
[58] Field of Search ............. 308/1 R, 3 R, 3 A, 5 R; 384/114; 310/369, 328; 84/DIG. 24

[56] References Cited

U.S. PATENT DOCUMENTS

| | | | |
|---|---|---|---|
| 1,860,529 | 5/1932 | Cady | 310/321 |
| 2,970,019 | 1/1961 | Brown et al. | 384/278 |
| 2,993,739 | 7/1961 | Hall | 308/1 R |
| 3,008,336 | 11/1961 | Leduc | 308/1 R X |
| 3,028,693 | 4/1962 | Malzahn | 308/3 R X |
| 3,084,003 | 4/1963 | Matt et al. | 384/278 |
| 3,114,848 | 12/1963 | Kritz | 310/322 |
| 3,239,283 | 3/1966 | Broeze et al. | 384/129 |
| 3,304,132 | 2/1967 | Broeze et al. | 308/1 R |
| 3,339,421 | 9/1967 | Warnock | 74/5 |
| 3,351,393 | 11/1967 | Emmerich | 384/222 |
| 3,359,045 | 12/1967 | Hsu | 308/1 R |
| 3,420,110 | 1/1969 | Evans | 74/5.1 |
| 3,433,538 | 3/1969 | Blanding et al. | 384/114 |
| 3,471,205 | 10/1969 | Farron et al. | 384/107 |
| 3,520,197 | 7/1970 | Blanding et al. | 308/1 R X |
| 3,626,510 | 12/1971 | Kauzlarich et al. | 308/1 R |
| 3,805,552 | 4/1974 | Heald | 308/3 R X |
| 3,997,954 | 12/1976 | White | 29/149.5 B |
| 4,099,211 | 7/1978 | Hathaway | 360/109 |
| 4,106,065 | 8/1978 | Ravizza | 360/109 |
| 4,188,645 | 2/1980 | Ragle et al. | 360/75 |
| 4,423,768 | 1/1984 | Edelman et al. | 310/369 X |

FOREIGN PATENT DOCUMENTS 0067317 5/1982 European Pat. Off. ............ 308/6 C

OTHER PUBLICATIONS

Salbu, "Compressible Squeeze Films and Squeeze Bearings", International Business Machines Corp., *Transaction of the ASME Journal of Basic Engineering*, Jun. 6, 1964.

Shigley, *Mechanical Engineering Design*, pp. 200–206, McGraw-Hill 1977, 3rd Edition.

*Primary Examiner*—Stuart S. Levy
*Assistant Examiner*—Joseph J. Hail, III
*Attorney, Agent, or Firm*—Richard E. Cummins; Thomas R. Berthold

[57] ABSTRACT

A sleeve/rod type squeeze bearing system is disclosed in which the cross-sectional geometry of the piezoceramic bearing driving element is geometrically dissimilar to the cross-sectional geometry of the bearing element to which it is connected. The arrangement permits the cross-sectional geometries of both bearing elements and the piezoceramic driving element to be optimized to perform their intended functions.

8 Claims, 5 Drawing Figures

CYLINDRICAL TYPE SQUEEZE BEARING SYSTEMS WITH BEARING AND DRIVING ELEMENTS ATTACHED IN AREAS OF MAXIMUM DEFLECTION

BACKGROUND OF THE INVENTION

1. Field of Invention

This invention relates in general to bearings and, in particular, to cylindrical type squeeze bearing systems.

2. Description of the Prior Art

The general theory underlying the operating principle of squeeze-type bearings is well documented in the prior art. The article entitled "Compressible Squeeze Films and Squeeze Bearings" by E. O. Salbu in the June 6, 1964 issue of the *Transaction of the ASME Journal of Basic Engineering* is an excellent basic reference for an understanding of the squeeze bearing technology. Since that time, various bearing systems have been suggested which rely on the basic squeeze bearing principle.

Recently, tubular or cylindrical squeeze bearings have been suggested as the bearing elements for the magnetic transducer carriage assembly of the transducer positioning system of a disk file. The function of these positioning systems is to position a magnetic transducer to a particular track on a magnetic disk. The positioning operation involves linear movement of the head over a range of travel of about one to two inches, with very precise accuracy. The transducer is mounted on a head-arm that is generally attached to the movable coil of a voice coil actuator. The coil and head-arm are attached to a carriage assembly which functions to precisely guide the head and coil as they are moved along a linear path between track addresses. It is important that the head to disk spacing be controlled since the spacing is critical to the successful writing and reading of data on to the disk. It is also important that the recording gap of the magnetic head assume the same angle, e.g., 90°, to the center line of the track if data is to be written and read accurately.

Conventional ball bearing roller systems that have been associated with carriage and way assembly disk file positioning systems operate satisfactorily but have one major disadvantage. That is that they inherently have a static friction problem and variable dynamic friction. These problems adversely affect access time and transducer positioning accuracy in the disk file. Since cylindrical squeeze bearings do not have these problems, their potential has created considerable interest in the use of these bearings for disk file applications.

Copending PCT application Ser. No. US82/01828, filed Dec. 30, 1982, entitled "Improved Long Tube Bender Element Squeeze Bearing", and assigned to the assignee of the present invention and commonly assigned application Ser. No. 273,280, filed June 12, 1981, in the name of Scranton and entitled "Planar and Cylindrical Oscillating Pneumatodynamic Bearings" disclose cylindrical squeeze bearings for disk file actuators.

As shown and described in these applications, the bearing system comprises generally a pair of cylindrical bearing elements disposed coaxially in a nested relationship. One bearing element is provided with the piezoelectric transducer or driving element to cause it to vibrate, that is, change its cross-sectional shape, the transducer being physically attached to one of the bearing elements. It will be appreciated by those persons skilled in the art that the dimensional tolerances of the piezoelectric transducer and the cylindrical bearing element to which it must be physically attached are critical to the proper operation of the bearing system. The requirement of these critical tolerances between the transducer and the driven bearing element substantially increases the cost of the bearing.

The present invention minimizes the need for critical tolerances which is inherent when the cross-section of the driving element is dictated by the configuration of the bearing element and may not be a shape that lends itself to being readily and inexpensively manufactured.

SUMMARY OF THE INVENTION

In accordance with the present invention, a squeeze bearing system is disclosed in which the cross-sectional geometries of one of the bearing elements and the associated driving element are not identical but are geometrically dissimilar. As a result, the geometries of the bearing and driving elements may be so different that the surfaces of the squeeze bearing elements can be given their most efficient cross-sectional geometry for the squeeze bearing action, while the driving element, which can be a two-layer or a single layer element, can have a cross-sectional geometry that is relatively easy to manufacture and, hence, more economical. Such two-layer driving elements are often referred to as bimorphs. See *Webster's Third New International Dictionary*, G. & C. Merriam Co., Springfield, MA (1968), p. 217.

In the disclosed arrangement, the driving element is physically attached to the associated bearing element at the antinodes by short longitudinal ribs.

It is, therefore, an object of the present invention to provide an improved squeeze bearing system.

A further object of the present invention is to provide an improved squeeze bearing system in which the cross-sectional geometries of the bearing elements have been selected to produce the optimum squeeze bearing action, and the cross-sectional geometry of the driving element has been selected to provide a relatively easily manufactured element.

The foregoing and other objects, features and advantages of the invention will be apparent from the following more particular description of a preferred embodiment of the invention as illustrated in the accompanying drawing.

DESCRIPTION OF THE PREFERRED EMBODIMENT

Figure 1:
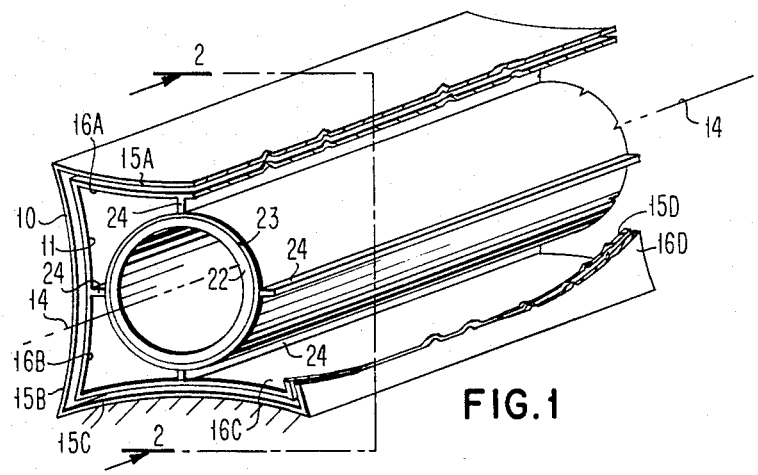
FIG. 1 is a perspective view, partly in section, of a squeeze bearing system embodying the present invention.

The squeeze bearing system shown in FIG. 1 comprises two nested bearing elements 10 and 11 which are disposed coaxially for relative movement parallel to axis 14 of the assembly. As shown diagrammatically in FIG. 1, bearing element 10 is fixed, while element 11 moves parallel to axis 14. If desired, element 10 could be a movable element, while element 11 is stationary. The cross-sectional geometries of the bearing elements 10 and 11 correspond generally to a cuspid, astroid-like shape having four concave side surfaces 15A through 15D and 16A through 16D, respectively. In the embodiment illustrated, the bearing elements 10 and 11 are geometrically similar. That is, their closed curve perimeters are essentially identically shaped but differ in overall size or position. The spacing between the elements 10 and 11, as shown in FIG. 1, is greatly exaggerated. The cross-sectional geometries of the bearing elements of the system shown in FIG. 1 were selected to provide a bearing system which is relatively stiff in the rotational direction, as disclosed in copending application Ser. No. 470,658, filed concurrently herewith, assigned to the assignee of the present invention and now abandoned.

The piezoelectric driving element for the bearing system shown in FIG. 1 preferably is a two layer element comprising the piezoceramic cylinder member 22 and the surrounding cylinder 23. If desired, cylinder 23 can function to place the piezoceramic cylinder member 22 is slight compression, which reduces the possibility of the cylinder member is failing from fatigue, as discussed in copending application Ser. No. 470,661, filed concurrently herewith and assigned to the assignee of the present invention.

Cylinder 23 is spaced radially from bearing element 11 except where it is attached to bearing element 11 by means of short rib members 24. The placement of rib members 24 is in the areas of driving element and driven member 11 is determined by the location of the antinodes of the two vibrating structures, that is, the loci of maximum deflection which will be determined by the dimensions of the two interconnected element 23 and 11. Preferably, the driving element is attached to driven element 11 at the antinodes.

Figure 2:
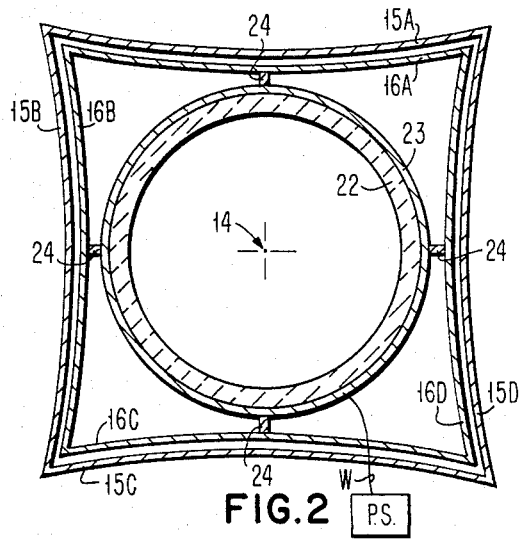
FIG. 2 is a cross-section of the bearing system shown in FIG. 1 taken along the line 2—2.
Figure 3:
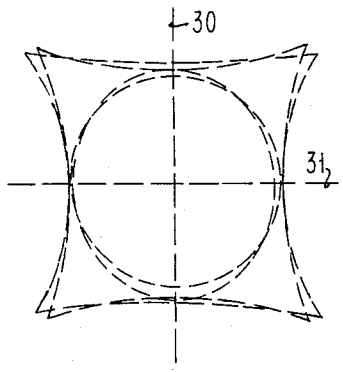
FIG. 3 is a view showing the cyclic deflections of the driving element and attached bearing element of the system shown in FIG. 2.

As shown in FIG. 2, the ribs 24 are spaced circumferentially around the driving element at 90° intervals corresponding to the antinodes or maximum points of deflection which are, as shown in FIG. 3, along vertical and horizontal reference lines 30 and 31. Preferably, the bearing system is symmetric about both axes 30 and 31 which are perpendicular to each other. Also, the dimensions of the system as measured on both axes 30 and 31 preferably are equal. Because cylinder 23 of the driving element and the driven bearing element 11 are spaced from each other and connected by ribs 24 at the antinodes, the driving element can be shaped for optimum performance as a driving element while the bearing elements can be shaped for optimum performance as squeeze bearing elements.

Figure 4:
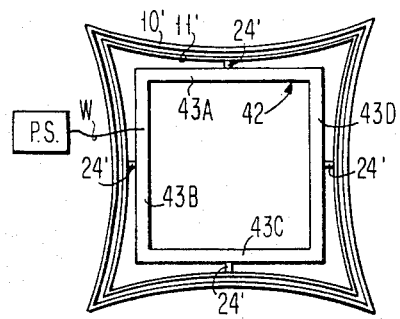
FIG. 4 is a cross-sectional view of a squeeze bearing system illustrating a modification of the invention shown in FIG. 1.

FIG. 4 illustrates a bearing system similar to the embodiment of the invention shown in FIG. 1. The bearing system of FIG. 4 differs from that shown in FIG. 1 in that the cylindrical piezoelectric driving element of FIG. 1 has been replaced by a substantially square driving element 42 which has been assembled using four separate flat piezoceramic pieces 43A through 43D. Element 42 may also be constructed as two layer structure such as the driving element of FIG. 1. Driving element 32 is attached to bearing element 11 by means of short longitudinal ribs 24' in a manner identical to that described in connection with FIGS. 1 and 2.

Figure 5:
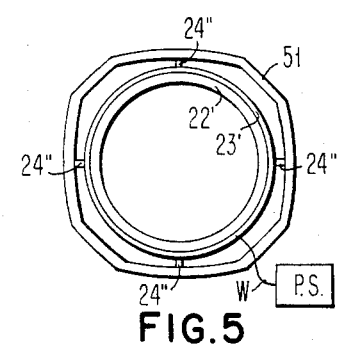
FIG. 5 is a cross-sectional view of a squeeze bearing system which illustrates a further modification of the invention shown in FIG. 1.

FIG. 5 illustrates a bearing system similar to the embodiment of the invention shown in FIG. 1 in that the same cylindrical driving element is employed, but the cross-sectional geometries of the bearing elements have been modified. As shown in FIG. 5, piezoceramic cylinder member 22' is basically identical to cylinder member 22 shown in FIG. 1 and is enclosed by a cylinder 23' having longitudinal ribs 24" which attach bearing element 51 to the cylinder 23'. The cross-sectional shape of the bearing elements shown in FIG. 5 is generally convex, while that shown in the other figures is generally concave. Either cross-section operates satisfactorily. In addition, the bearing elements may have a square cross-section and a circular-shaped driving element or a circular-shaped cross-section with a round driving element. In general, in accordance with the illustrated embodiments of the invention, the geometric shapes of the bearing elements, on the one hand, and the driving element, on the other hand, are geometrically dissimilar. That is, their closed curve perimeters are not identically shaped. Preferably, the driving elements are made in simple geometric shapes which are less complex then the bearing elements so that the driving elements will be less difficult to manufacture to the required tolerances. Those skilled in the art will appreciate from the foregoing description, however, that the invention includes within its scope any squeeze bearing in which the driven bearing element and the driving element are spaced from each other but connected at the antinodes to transmit vibration most effectively. This configuration facilitates but does not require the use of dissimilar geometries for the bearing members and the driving member.

The various driving elements are provided with a suitable means to activate the piezoceramic material at the desired frequency to establish the bearing relationship between the bearing surfaces. This means is shown in the drawing schematically as a signal lead W from the driving element to a power source PS.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A squeeze bearing system comprising:
    a piezoelectric driving element having an operating frequency and antinodes when vibrating at said operating frequency;
    a first bearing element also having antinodes at said operating frequency, said driving element and said first bearing element being coaxially nested about a longitudinal axis and spaced-apart radially about said axis, the radial spacing varying with angular position about said axis such that the configurations of said driving element and said first bearing element at cross sections perpendicular to said axis have substantially different geometric shapes;
    a second bearing element coaxial with and radially spaced from said first bearing element; and
    means, extending across the radial spacing between said driving element and said first bearing element at areas thereon determined by the location of said antinodes, for connecting said driving element to said first bearing element and for supporting said driving element and said first bearing element in their spaced-apart relationship, whereby when said driving element vibrates at said operating frequency said first bearing element changes its cross-sectional configuration cyclically to create a squeeze film between said first and second bearing elements.

2. A squeeze bearing system according to claim 1, wherein said means for connecting comprises a plurality of ribs extending between said areas at said antinodes.

3. A squeeze bearing system according to claim 1, wherein said bearing elements have the same geometric configuration at cross sections to said axis and wherein the cross-section of either said driving element or said bearing elements is non-circular.

4. A squeeze bearing system according to claim 3, wherein each element with a non-circular cross-section is symmetrical about a first plane within which said longitudinal axis lies.

5. A squeeze bearing system according to claim 4, wherein each element with a non-circular cross-section is symmetrical about a second plane within which said longitudinal axis lies.

6. A squeeze bearing system according to claim 5, wherein said first plane is disposed at 90 degrees to said second plane.

7. A squeeze bearing system according to claim 6, wherein each element with a non-circular cross-section has a configuration corresponding generally to an astroid.

8. A squeeze bearing system according to claim 3, wherein said driving element has a circular cross-section and further comprises a piezoelectric hollow cylinder having one of its cylindrical surfaces in complete contact with a second hollow cylinder.

* * * * *